United States Patent [19]

Dosmond

[11] 4,287,723
[45] Sep. 8, 1981

[54] CENTRAL HEATING AND/OR SANITARY OR INDUSTRIAL HOT-WATER PRODUCTION INSTALLATION

[76] Inventor: René Dosmond, "La Poussiniere" Hameau de la Jonchere Chemin des Vignes, 92500 Rueil-Malmaison, France

[21] Appl. No.: 127,232

[22] Filed: Mar. 4, 1980

[30] Foreign Application Priority Data

Mar. 5, 1979 [FR] France ................. 79 05660

[51] Int. Cl.$^3$ ........................................... F25B 27/02
[52] U.S. Cl. ................................. 62/238.6; 62/324.5; 237/2 B
[58] Field of Search ................ 62/238 E, 324 D; 237/2 B, 8 R

[56] References Cited

U.S. PATENT DOCUMENTS 3,236,292  2/1966  Smith, Jr. ....................... 237/8 R
3,989,183  11/1976  Gustafsson .................... 237/8 R
4,055,963  11/1977  Shoji et al. .................... 62/324 D
4,112,705  9/1978  Sisk et al. ..................... 62/324 D

FOREIGN PATENT DOCUMENTS 2451544  5/1976  Fed. Rep. of Germany ..... 62/324.4

Primary Examiner—Lloyd L. King
Attorney, Agent, or Firm—John T. Synnestvedt; Albert L. Free

[57] ABSTRACT

A central heating and/or hot-water production installation of the type using at least one source of conventional energy of the liquid or gaseous fuel kind and at least one heat pump thermodynamic heat source particularly of the compression heat cycle kind.

In this installation the evaporator(s) of the heat pump(s) are situated in a duct for discharging the combustion gases from the boiler and, in conjunction with this duct, there are provided one or more outside air intakes having flow-adjustment means, upstream of said evaporator(s).

Principal applications: heating industrial, agricultural or living premises, etc. and production of sanitary or industrial hot water.

6 Claims, 2 Drawing Figures

CENTRAL HEATING AND/OR SANITARY OR INDUSTRIAL HOT-WATER PRODUCTION INSTALLATION

BACKGROUND OF THE INVENTION

The present invention concerns central heating and/or hot-water production installation, of the type using at least one conventional source of heat of the liquid or gaseous fuel boiler type, and at least one thermodynamic heat pump source of heat, particularly of the compression heat cycle formed by a closed circuit in which flows a refrigerating fluid and comprising in series, in a way known per se, an evaporator, a compressor, a condenser forming the thermodynamic heat source properly speaking, and an expansion means for the condensed refrigerating fluid, one or more circuits for the circulation of the heat-carrying fluid of the central heating and for the production of sanitary or industrial hot water being furthermore provided and arranged to be the seat of heat exchanges with said above-mentioned heat sources.

Of course, this kind of installation may comprise one or more boilers and one or more heat circuits according to the application contemplated. These installations may in this respect be provided for heating living, industrial use, commercial or else agricultural premises for the whole or part of the year, and the hot water produced may also be for different uses, for example for sanitary or industrial use. As for the heat-carrying fluid of the central heating, it will be readily understood that it may be any appropriate fluid, for example water or air.

Installations of the above-defined type are known, i.e. in brief installations using heat sources of different kinds, on the one hand conventional of the boiler kind consuming a liquid or gaseous fuel, on the other hand of the heat pump thermodynamic kind, the heat being taken from any cold source (outside air, river, etc.). These installations have been developed in recent years since attempts have been made to economize fuels.

However, it is observed that known installations are not yet adapted for obtaining the best possible energy yields. In particular, conventional central heating boilers do not use as well as possible the energy of the fuel. They only use the lower heating power of the fuel, instead of using the higher heating power thereof. In particular, conventional boilers, whether they are used alone or in combination with the other heat sources in question, do not take advantage of the latent heat of vaporization of the water contained in the combustion gases, for the vapor is for a large part discharged into the atmosphere with the smoke; they only use the sensible heat of the combustion gases, and even so imperfectly. In fact, the combustion gases are discharged into the chimney at a temperature still relatively high, i.e. heat is still lost. Finally, there is in general an air intake to the burners which is excessive in relation to the needs of a stoechiometric combustion.

All that results in only 80 to 85% of the upper heating power of the fuel being used in such installations.

It should also be noted that the temperature of the heat-carrying fluid of conventional boilers is often maintained higher than that necessary for the central heating, because of the necessarily higher temperature which is required for the production of sanitary or industrial hot water; that makes more perceptible the weakness—relative—of the efficiency of the boiler during periods of moderate heating.

Furthermore, if we now consider no longer the boiler(s) and their efficiency, but their association, in installations of the type in question, with other heat sources of the heat pump kind, poor cooperation of these two kinds of sources is generally found, because designed separately and associated in a way which, from the point of view of energy efficiency and complementarity, is far from being ideal, at least during a considerable proportion of the year, particularly in the cold season.

As for heat pumps, it is known particularly from theory and practice that their overall energy efficiency diminishes when the temperature difference between the cold source and the hot source increases, i.e. especially when the temperature of the cold source diminishes, which is the case as a rule in winter, precisely when the heat needs for heating the premises are the highest. Furthermore, even as far as the production of sanitary hot water is concerned, a temperature of 60° to 65° C. must be obtained for the condenser of the heat pump concerned, assuming that the heat for the production of this hot water is taken directly from this condenser rather than from the boiler, which for low temperatures at the evaporator only allows a mediocre efficiency for the heat pump to be obtained. The ideal temperature difference between the evaporator and the condenser ranges in fact between about 40° and 45° C. When atmospheric air is used as the cold source, the reduction of the enthalpy of this air in winter makes this lowering of the efficiency of the heat pump particularly clear.

An additional important problem is moreover often posed in winter, when compression cycle heat pumps are used: it is the problem of icing up of the evaporator (or evaporators) whose de-icing may require the use of a supplementary source of heat, sometimes an electric heating device and which, whatever the solution chosen, contributes further to diminishing the efficiency of the heat pump (taking a part of the heat of the condenser for de-icing, or other solutions).

Finally, it should be noted that the power of the compressors is relatively limited, because of the high electric current consumed at start-up.

The aim of the present invention is generally to remedy these shortcomings found in known installations such as defined at the beginning. This aim is in particular to use better than before the heating power of the fuel, and to take advantage of the heat for vaporizing the water vapor contained in the fumes; it is to discharge this smoke into the atmosphere at the lowest possible temperature, a little above 0° C., and thus finally to use in the best way possible the enthalpy of the combustion gase (sensible heat and latent heat). This aim of the invention is at the same time, in installations of the kind in question, to arrange things so that the heat pump(s) operate under conditions enabling them to reach a better efficiency and in any case under the best possible operating conditions, whether in cold or hot seasons, for central heating or for the production of sanitary or industrial hot water alone, by using in the best way possible the free enthalpy of the cold source, i.e. principally that of atmospheric air.

SUMMARY OF THE INVENTION

All these aims are attained in an installation of the kind defined at the beginning wherein, in accordance with the invention, the evaporator(s) of the heat pump(s) are located in a duct for discharging the combustion gases of the boiler, and which comprises, in conjunction with this duct, one or more outside air intakes provided with flow-regulating means upstream of said evaporator(s).

With this arrangement, the combustion gases of the boiler pass over the evaporator(s) of the heat pump(s) and they are cooled while supplying heat to the evaporators and this with condensation of the water vapor which they contain. Thus the total heat of the smokes is better used before their low-temperature discharge into the atmosphere. Thus the usual loss in heat is considerably reduced and the upper heating power of the fuel is used in the best way possible.

Furthermore, the enthalpy of the outside air is used under much better conditions than before, here again as for the smokes, by using its sensible heat and the latent heat of the water vapor which it contains for heating the evaporator(s) and for evaporating the refrigerating fluid, for it is possible with the above-defined arrangement to operate at least some of the heat pumps with a temperature at the evaporator higher than in the installations of the prior art, because this fresh air coming from outside mixes with the hotter smoke before passing over the evaporator(s). In addition, it will be easy to avoid icing-up of the evaporators, which risks occurring especially in winter, since precisely at this season the boiler(s) will be operating. There will then be no additional energy required for carrying out this de-icing. As for the flow-regulating means, they will of course enable the proportion of the heat flow coming directly from the boiler and of the thermodynamic source flow, i.e. the amount of heat coming from the outside air, to be regulated at will, depending on certain outside, for examle climatic, conditions or conditions of use (a greater or lesser demand for sanitary or industrial hot water in relation to the heating demand from the central heating, etc.).

It may be noted here that the outside air used in the installation may, when the boiler is in operation, be formed essentially of two parts: one part passing through the boiler, used as stoechiometric air and even in excess in relation to the stoechiometric conditions, which ensures perfect combustion of the fuel and, by diluting the smoke, will avoid fouling up of the discharge duct; and one part not passing through the boiler but arriving downstream of the conventional part thereof, as it were through a by-pass, directly into the duct, for the production of heat by means of the thermodynamic circuit(s). This second air flow will in general be considerably higher (for example twenty to fifty times greater) than that of the air required for the stoechimetric combustion of the fuel, and this particularly when the season or the climatic conditions increase the enthalpy of the outside air and make this source of energy more advantageous.

When these conditions are particularly favorable, the boiler will be stopped, and this second portion of air, the flow of which will possibly be increased, may form the only source of heat for the production of sanitary or industrial hot water and also possibly for heating premises.

It is to be noted also that by the expression "outside air" used above, it is not intended to designate only atmospheric air but, more generally, air which is outside the installation, i.e. outside the boiler part and the thermodynamic part thereof. In particular, it is not excluded that a part of this air (as a rule in a fairly small proportion) is foul and humid air extracted from the heated premises by controlled mechanical ventilation. The heat from the vapor due to human or animal breathing may then also be used by the heat pump(s) of the installation.

In brief, and whatever the exact embodiment chosen, the installation of the invention provides, in all circumstances, at all seasons and even at any moment in the day, an energy yield considerably higher and under better operating conditions than the installations of the prior art.

In general, it will be very advantageous although this does not form an obligatory characteristic of the invention to arrange, with the duct containing several independent evaporators which considered successively in the flow direction of the gases (air and water vapor and possibly combustion gases) are subjected to decreasing temperatures, that each evaporator is associated with a condenser in a compression heat pump heat circuit so that the difference in temperature between each evaporator and the condenser which is associated therewith is relatively reduced—of the order of 40° to 45° C.

With this arrangement, the difference in temperature between the evaporator and the condenser of each heat pump may be reduced to a large extent and so the thermodynamic efficiency of each of them considerably increased, with temperatures decreasing, not only for the evaporators but also for the condensers, in the flow direction of the gases and of the air in said discharge duct.

This complementary arrangement of the invention obviously requires additional investment in equipment, in relation to an installation which comprises only a single heat pump, with equality of thermodynamic source heating power, but the considerable increase in the efficiency of each heat pump (an increase in efficiency of 50 to 100% may be reckoned on) forms the advantageous counterpart thereto, and it should furthermore be noted that the compressors may be all the less powerful and will be more flexible in use and more economic in upkeep than the large compressors, moreover in less general use.

The arrangement in question consisting in using several heat pumps operating at stepped temperatures presents furthermore and especially the very great advantage of considerably increasing the flexibility of operation of the thermodynamic part of the installation, by improving the determination and the distribution of the different flows of fluids used: in this discharge duct with respect to the temperature and the relative flows of the combustion gases from the boiler and of the outside air on the circuit of the evaporators; and at the condensers, i.e. heat exchangers with what was called above "the circuits for the circulation of the heat-carrying fluid and for the production of sanitary or industrial hot water".

As a complement to the above-defined arrangement whose essential advantages have just be enumerated, an installation in accordance with the invention may further be characterized in that the electric circuit supplying the compressors with current is associated with a control device arranged to prevent two or more compressors from absorbing at the same time the peak of starting current.

It may be any adequate device, particularly electronic. In any case, this complementary arrangement will avoid very heavy demands for current, which will make less constraining and less costly the installations for supplying electricity and for protecting the compressors as well as in certain cases the supply of electrical energy.

As for the construction of an installation in accordance with the invention, it will be advantageous for said duct for discharging the combustion gases from the boiler, in which are disposed the evaporator(s) of the heat pump(s) to be staggered axially in relation to the body of the boiler and to be extended downwards by a lower duct portion situated laterally in relation to said body, with or without spacing therebetween, this lower lateral part of the discharge pipe comprising the outside air intake(s) with their flow regulating means, filters, variable-speed fans or similar, duct for discharging condensates, or products used for cleaning the evaporators, possibly a manhole and other members or elements required for maintaining or inspecting said duct.

It can be seen that an installation in accordance with the invention will thus comprise two operationally distinct parts: the conventional boiler part, with fire-chamber and the thermodynamic part with its discharge duct (containing the evaporator(s) of the heat pump(s)), air intakes, fans and accessories. This embodiment has the merit of simplicity and will greatly facilitate the discharge of condensates and products possibly used for cleaning the evaporators, since these liquids will flow to the bottom of the lower lateral part of the discharge duct, away from the fire-chamber.

This arrangement enables in particular a very large quantity of outside air to be passed directly over the evaporators of the discharge duct without causing it to pass through the boiler part, by making it follow the by-pass formed by what was called above the lower part of the discharge duct, which avoids adversely affecting the volumetric efficiency of the fire-chamber.

The installation may further be arranged for said discharge duct to contain, extending over an essential part of its section, at least one baffleplate barrier or similar, substantially at its junction with the outlet of the combustion gases from the boiler. Thus the mixing between the combustion gases from the boiler (of course when this latter is operating) and the outside air introduced at the base of the discharge duct is homogenized and this before this gas current reaches the first evaporator.

In the preferential but not obligatory embodiment according to which the discharge duct contains several (at least two) evaporators, the installation may further be arranged for this duct to comprise at least one adjustable flow by-pass passage, for communicating the outside air intake(s) directly with the space separating two consecutive evaporators.

The means for regulating the flow in the by-pass may be a simple register. This arrangement of the invention gives further an additional regulating facility, particularly in enabling the operating temperature of an evaporator to be increased with respect to that or those which are downstream (by increasing the flow of the by-pass) or conversely.

Finally, one or more sprinkling ramps may be disposed in the discharge duct above the evaporator(s).

The evaporators and the baffleplate barriers may thus be conveniently cleaned. The cleaning water will be recovered at the bottom of the duct, with the condensates. Thus a considerable part of the installation may be cleaned without interrupting the operation thereof.

The above and other objects, features and advantages of the present invention will become apparent from the following description, given solely by way of non-limiting illustration, when taken in conjunction with the accompanying drawings.

DESCRIPTION OF THE PREFERRED EMBODIMENTS

Figure 1:
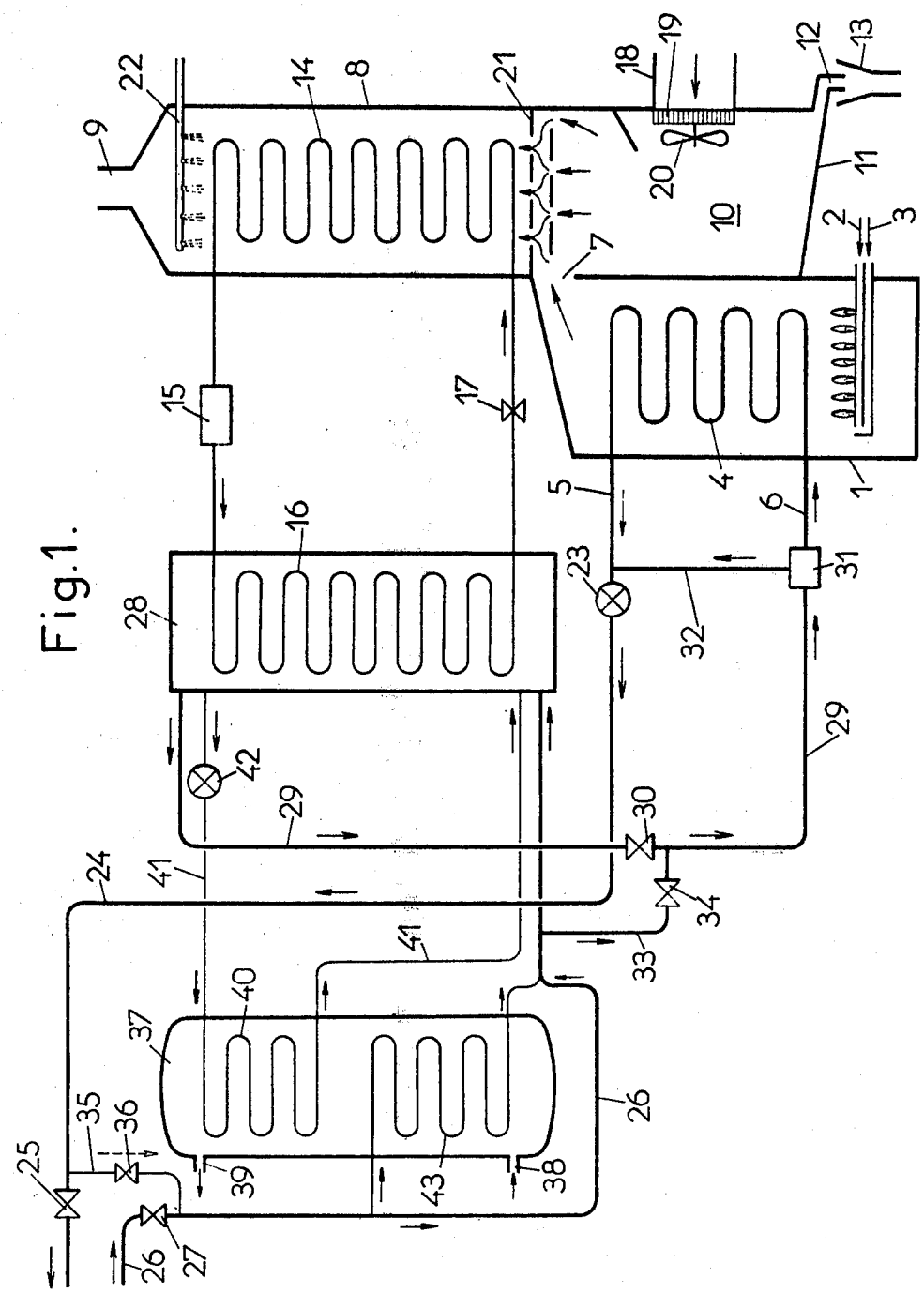
FIG. 1 shows schematically an installation in accordance with the invention, whose discharge duct, adjoining the boiler, contains a single heat pump evaporator.

The installation of FIG. 1 comprises a boiler 1 having fire-chamber similar to that of a conventional boiler, provided with a combustible fluid intake 2 and a combustive air intake 3. The flows at 2 and 3 are adjustable and, as pointed out earlier, air intake 3 may be regulated to a flow substantially greater than that which would allow just stoechiometric combustion of the fuel. There is shown in the form of a coil 4 the hot water production circuit of the boiler, this water leaving by outlet 5 and returning to said circuit—cooled after use—through inlet 6.

The outlet 7 for the combustion gases of the boiler communicates with a discharge duct 8 itself communicating, at its upper part, with a smoke discharge shaft 9. From outlet 7, this duct 8 is extended downwards by a lower part 10 provided with a sloping flow bottom 11 and a liquid discharge outlet 12. (Reference 13 designates any discharge gully or spout). As can be seen in the figure, duct 8 is staggered in relation to the body of boiler 1 so that a part 10 may extend laterally at the side thereof and so that the whole of duct 8, from shaft 9 to bottom 11, may have the form of a straight and vertical column.

This column or duct contains in its upper part an evaporator 14 forming with compressor 15, condenser 16 and a pressure reducer 17, a compression heat pump circuit, this circuit having passing therethrough a refrigerating fluid, for example freon, and operating in a well-known cycle to take heat from evaporator 14 and restore it to condenser 16. The lower lateral part 10 of discharge duct 8 is provided furthermore with an intake 18 for humid outside air, filtered at 19 and drawn into the duct by a fan 20 (means for regulating the air flow have not been shown; a multispeed fan may be used).

At the level at which outlet 7 for the combustion gases from the boiler emerges into duct 8, this latter comprises a baffleplate barrier 21 serving to homogenize the mixing of these gases and the air introduced at 18. Finally, duct 8 comprises above evaporator 14 a sprinkling ramp 22 able to operate intermittently for cleaning the evaporator and the baffleplates. The water or other cleaning product, as well as the condensates coming from the condensation on evaporator 14 of the water vapor contained in the combustion gases and in the humid outside air introduced at 18 into duct 8, may leave through outlet 12 after flowing over the sloping bottom 11.

As far as the outside circuits are concerned now, they may comprise a central heating circuit with hot water radiators (not shown) connected to the outlet 5 of the heating circuit 4 of the boiler by means of a pump 23 and a pipe 24 having a valve 25. The return circuit for the radiators comprises a pipe 26 with a valve 27 and communicating with the return inlet 6 of the boiler through the exchange volume 28 of condenser 16, a pipe 29 with a valve 30, and a distributor 31 also connected to outlet 5 by piping 32. Pipe 26 is also connected to pipe 29, downstream of valve 30, by piping 33 having a valve 34. Furthermore, piping 35 having a valve 36 connects pipe 24, downstream of valve 25, to pipe 26, downstream of valve 27 (having regard to the flow direction of the water shown by arrows).

These external circuits may comprise furthermore a circuit for the production of sanitary or industrial hot water. The installation comprises therefore an apparatus for producing hot water in the exchange volume, referenced at 37, to which cold water is brought at 38 and from which hot water leaves at 39. This apparatus comprises a first exchanger 40 connected to the exchange volume 28 of condenser 16 by a pipe 41 in which the water flows (in the direction of the arrows), possibly by means of a pump 42, and a second exchanger 43 forming a by-pass of the return pipe 26 of the central heating.

The installation which has just been described operates in the following way: when the heating of premises by central heating is required, valves 34 and 36 being assumed closed and valves 25, 27 and 30 open, pumps 23 and 42 are started up and the position of distributor 31 controlled automatically, for example depending on the temperature in the premises to be heated. The tepid return water of the central heating, in pipe 26, is at a temperature $t_1$; it is reheated in the exchange volume 28 of condenser 16 and leaves therefrom through pipe 29, at the temperature $t_2$. If this temperature $t_2$ is insufficient for the central heating, distributor 31 directs all or part of the water flow from pipe 29 towards exchanger 4 of boiler 1. The water leaves therefrom at 5 at temperature $t_3$ and mixes with the water passing possibly through piping 32. The water thus obtained at the desired temperature $t_4$ (as a rule between the temperatures $t_2$ and $t_3$) is fed to pipe 24 for supplying the central heating, the circulation being provided by pump 23.

As for the sanitary or industrial hot water, it is obtained at 39 at temperature $t_5$.

The heat for exchange volume 37 of the heating apparatus is provided at a high temperature by exchanger 40 and at a lower temperature by bypass 43. As can be seen in the drawing, the heat supplying the exchanger is wholly taken from the exchange volume 28 of condenser 16 (pipe 41—pump 42).

During this period of use of the installation, fuel for the boiler will only be used to the extent that the enthalpy of the air fed in at 18 is insufficient for providing the required heating energy, by the heat pump, to condenser 16. In any case, as was clearly indicated above, the invention allows the upper heating power of the fuel to be used, for the heat for vaporizing the water vapor contained in the smoke may be recovered on evaporator 14, which heat is added to the sensible heat (and to the total heat from the outside air taken).

It should be noted that if temperature $t_5$ of the water taken at outlet 39 is insufficient, the closing of valve 30 and the opening of valve 34 will enable the return water from the central heating to be passed directly to boiler 1, without preheating by condenser 16, which causes the temperature $t_5$ to be raised since then all the heat produced by the condenser will be used in exchange circuit 40.

During the periods when the central heating is not required, the circuit of the radiators may be isolated by closing valves 25 and 27 and opening valve 36 and the boiler may be stopped. Since the enthalpy of the outside air is maximum at these periods, it will be sufficient (possibly with an increase flow) for the production of sanitary or industrial hot water, with only the use of the heat pump.

In the above-described installation, which uses only a single evaporator 14, too high a temperature difference may be observed, especially in winter, between the evaporator and the condenser, which corresponds to lower efficiency of the heat pump. It may be observed moreover that the smoke and the air escaping through discharge shaft 9 still contain a little water vapor and are not yet at a sufficiently low temperature.

Figure 2:
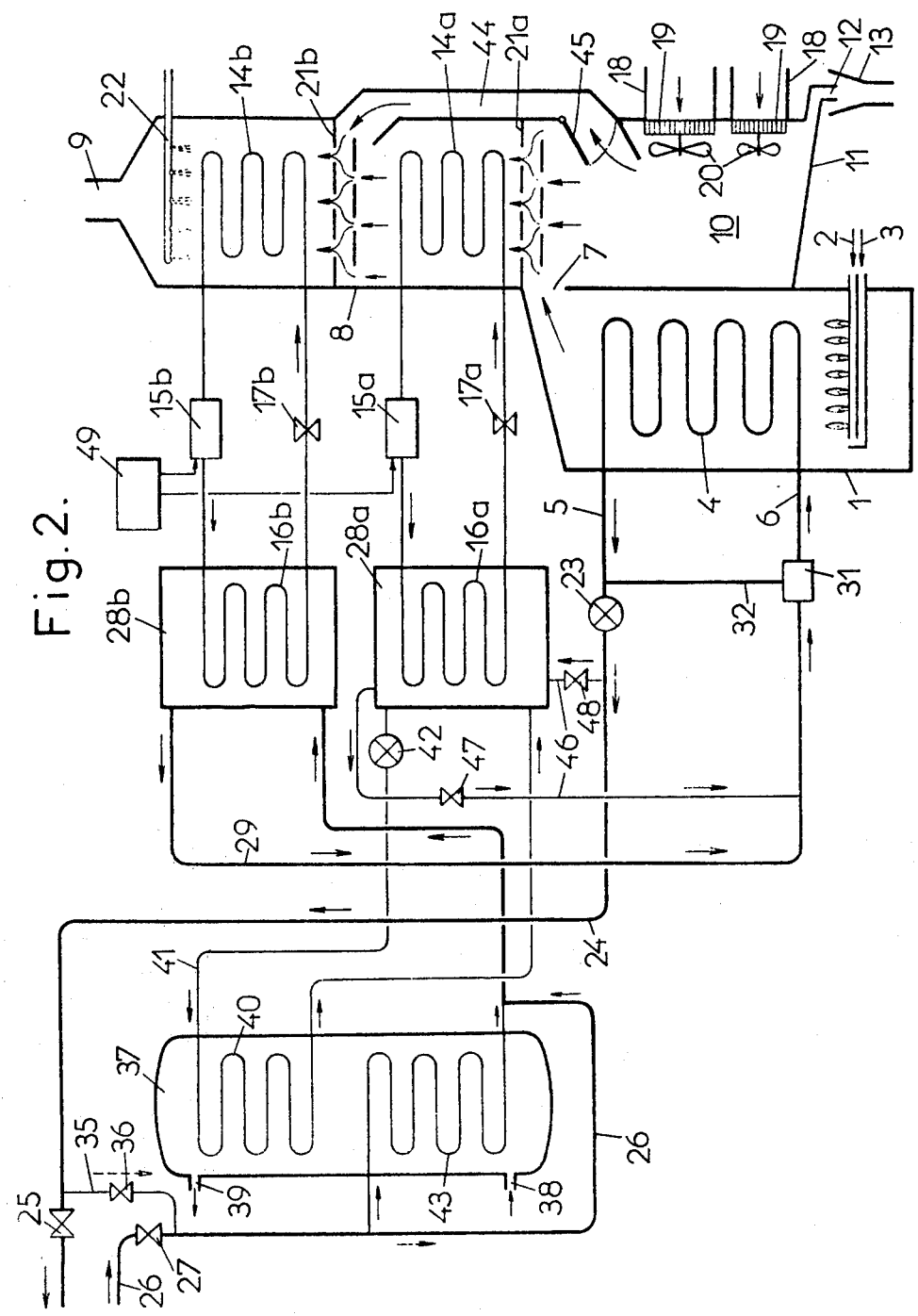
FIG. 2 shows schematically another installation in accordance with the invention, whose discharge duct contains two evaporators each forming part of a separate heat pump.

The installation may then be improved in accordance with the diagram of FIG. 2, by use of two evaporators (or several evaporators).

In this FIG. 2, some elements, piping or parts of the installation are identical or similar, disposed in the same way or having the same role respectively as the elements, piping or parts of the installation of FIG. 1; they are shown respectively with the same references, which avoids describing again the arrangement or the operation thereof.

In this FIG. 2, there are shown at 14a and 14b two evaporators disposed in discharge duct 8. The lower evaporator 14a will operate of course at a higher temperature than upper evaporator 14b; these evaporators form part respectively of two separate heat pump circuits similar to that of FIG. 1, and whose elements have been shown by the same references to which the letter a has been added for the lower heat pump and the letter b for the upper heat pump. Similarly, there is shown at 21a a baffleplate barrier disposed in the same position as barrier 21 of FIG. 1, and by 21b a baffleplate barrier disposed between the two evaporators.

This second barrier is located at the level of the output of a lateral by-pass duct 44 equipped at its inlet with a flow-regulating flap 45 and which enables, as already pointed out, the proportions of the outside air to be regulated between the two evaporators, to adjust their operating temperature. On the other hand, to show that the installation may be more powerful than the preceding one, and that it may require a larger outside air flow, there is shown in FIG. 2 two air intakes 18, two filters 19 and two fans 20, for example also variable-speed fans.

As for the outer central heating and hot water production circuits, a complete analogy can be observed with the corresponding circuits of FIG. 1. However, a division of the functions is noticed between the exchange volumes 28a and 28b of condensers 16a and 16b of the two heat pumps: the first 28a serves in principle solely as a heat source for exchanger 40 of the hot water production apparatus, for it supplies water at a very high temperature, whereas the second 28b producing a lower temperature only serves for preheating the return water of the central heating before passing into the boiler. Communication may however be established between the exchange volume 28a and circuit 24-29 by means of a circuit 46 having valves 47 and 48.

It is also to be noted, as a particular characteristic of this embodiment, that the two compressors 15a and 15b are associated with an electronic control circuit 49 adapted to prevent simultaneous starting, so as to limit the current consumption peaks.

With these arrangements there may be provided approximately for evaporator 14a a temperature of 20° C., for condenser 16a a temperature of 65° C., for evaporator 14b a temperature of 0° to 5° C. and for condenser 16b a temperature of 40° to 45° C., which allow an excellent yield for each of the two heat pumps to be obtained by limiting the difference in temperature between the evaporator and the condenser of each of them.

It should also be noted that the air fed into one of the inlets 18 may come from a source different from that of the air fed into the other inlet; for one, it may be for example outside air and for the other air coming from heated premises, or else from premises for agricultural or industrial use producing large amounts of vapor. The flows at these two inlets may moreover be adjustable independently one of the other.

For the essential in any case the installation of FIG. 2 will operate according to the same principles as that of FIG. 1.

It is apparent that within the scope of the invention, modifications and different arrangements can be made other than are here disclosed. The present disclosure is merely illustrative with the invention comprehending all variations thereof.

In particular there may be provided, for the outside central heating and sanitary or industrial hot water production circuits, other schemes than those of FIGS. 1 and 2. Particularly, in the case of FIG. 2, where two heat pumps are used, it could be arranged for the two exchange volumes 28a and 28b of the condensers to be connected in series between pipes 24 and 29, instead of being connected to separate circuits.

Similarly, as far as discharge duct 8 is concerned it could be arranged horizontally and not vertically, in particular if, as for the boilers of blocks of flats, the height of the premises is limited with a high demand for heating power.

Finally of course the use of several boilers may be combined in different ways with the use of several discharge ducts equipped with evaporators and the proportions of the different heating flows from the boiler(s) and the outside air may be regulated each time at will.

I claim:

1. An installation for central heating and/or hot water production of the type using at least one source of conventional heat of the liquid or gaseous fuel boiler kind, and at least one source of heat pump thermodynamic heat, particularly of the compression heat cycle kind formed by a closed circuit in which flows a refrigerating fluid and comprising in series, in a way known per se, an evaporator, a compressor, a condenser forming the thermodynamic heat source properly speaking, and an expansion member for the condensed refrigerating fluid, one or more circuits for the circulation of the heat-carrying fluid of the central heating and for the production of sanitary or industrial hot water being furthermore provided and arranged to be the seat of heat exchanges with said above-mentioned heat sources, an installation in which a heat pump evaporator is situated in a duct for discharging the combustion gases from the boiler, there being provided in conjunction with this duct, upstream of said evaporator, one or more outside air intakes provided with flow-regulating means, wherein said duct contains several independent evaporators which, considered successively in the flow direction of the gases (air and water vapor and possibly combustion gases) are subjected to decreasing temperatures, each evaporator being associated with a condenser in a compression heat pump heat circuit so that the temperature difference between each evaporator and the condenser which is associated therewith is relatively reduced—of the order of 40° to 45° C.

2. The installation as claimed in claim 1, wherein the electric circuit for supplying the compressors with current is associated with a control device adapted to prevent two or more compressors from consuming at the same time the starting current peak.

3. The installation as claimed in claim 1 or 2, wherein said discharge duct for the combustion gases of the boiler, in which the heat pump evaporators are disposed, is staggered axially in relation to the body of the boiler and is extended downwards by a lower part of this duct situated laterally in relation to said body, with or without spacing therebetween, this lateral lower part of the discharge duct comprising said outside air intake(s) with their flow-regulating means, filters, variable-speed fans or similar, evacuation pipe for the condensates, or products used for cleaning the evaporators, possibly a manhole and other members or elements required for maintaining or inspecting said duct.

4. The installation as claimed in claim 3, wherein said discharge duct contains, extending over an essential part of its section, at least one baffleplate barrier or similar, substantially at the level of its junction with the outlet of the combustion gases from the boiler.

5. The installation as claimed in claim 1, wherein the discharge duct comprises at least one adjustable flow by-pass passage, for directly communicating the outside air intake(s) with the space separating two consecutive evaporators.

6. The installation as claimed in claim 1, wherein that one of the thermodynamic heat sources which operates at the highest temperature is connected to an exchanger for the production of sanitary or industrial hot water by means of a heat-carrying fluid circuit comprising furthermore a flow-distributing device for enabling the excess heat not absorbed by the production of sanitary or industrial hot water to be used possibly for the central heating.

* * * * *